United States Patent [19]
Grosse et al.

[11] 3,864,365
[45] Feb. 4, 1975

[54] CARBONIC ACID DERIVATIVES OF ESTRADIOL AND PROCESSES FOR THEIR PRODUCTION

[75] Inventors: Peter Grosse; Kurt Ponsold; Richard Prousa; Ralf Schnabel; Jutta Von Zychlinski, all of Jena, Germany

[73] Assignee: Veh Venapharm Jena, Jena, Germany

[22] Filed: July 27, 1973

[21] Appl. No.: 383,445

[52] U.S. Cl.............. 260/397.5, 260/349, 424/243
[51] Int. Cl.......................................... C07c 169/20
[58] Field of Search................................. 260/397.5

Primary Examiner—Elbert L. Roberts
Attorney, Agent, or Firm—Michael S. Striker

[57] ABSTRACT

The present invention pertains to compounds which are carbonic derivatives of estradiol (1,3,5(10)-estratriene-3,17β-diol) and processes of producing such compounds which have the following general formula

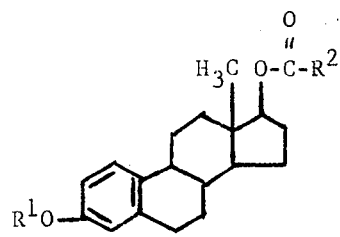

in which $R^1$ is a hydrogen or methyl radical, and $R^2$ is a chlorine, amino, alkylamino, dialkylamino, arylamino, aralkylamino, cyclohexylamino, alkylarylamino, hydroxyarylamino, dialkylhydrazino, alkenylhydrazino, arylaminosulfonyl, alkylmercapto, arylmercapto, cyanoalkoxy, alkynyloxy, aryloxy, alkoxyaryloxy, nitroaryloxy, quinolyloxy, azido, cyano, alkenylaminooxy, isothioureido, or dialkylaminoalkoxy radical.

The compounds are useful as postcoital contraceptive agents.

40 Claims, No Drawings

CARBONIC ACID DERIVATIVES OF ESTRADIOL AND PROCESSES FOR THEIR PRODUCTION

BACKGROUND OF THE INVENTION

It is generally known that steroids containing a 17-hydroxyl substituent can be converted to carbonic acid derivatives. Thus, for example, by means of chlorocarbonic acid esters, methylcarbonic acid and ethylcarbonic acid esters, namely 3-hydroxy-17β-methylcarbonyloxyestra-1,3,5(10)-triene and 3-hydroxy-17β-ethylcarbonyloxyestra-1,3,5(10)-triene, can be prepared from estradiol. Estradiol as well as its esters with acetic, benzoic, and phosphoric acids, in which the hydroxyl radical in the 3 position has been esterified, can be converted to 17β-urethanes by converting their chlorocarbonic acid esters with β,β'-dihalogen-substituted diethylamines. However, there is not yet known a generally available procedure which permits the production of compounds having the foregoing formulae with the specific extensive variations of the $R^1$ and $R^2$ substituents in a technologically simple manner.

It is known that the strength and duration of the estrogenic effectiveness of steroid hormones of the estradiol series can be increased by esterification of the 17-hydroxyl radical thereof and a similar increase was also described for the foregoing methylcarbonic acid and ethylcarbonic esters of estradiol. However, no good general procedure has been disclosed which permits the production in a simple manner of the still unknown compounds having the foregoing general formulae with the specified extensive variations of the $R^1$ and $R^2$ substituents, which was desired in order to investigate the variation in the intensity of the estrogenic effectiveness of such compounds.

BRIEF SUMMARY OF THE INVENTION

The object of the present invention is to provide new carbonic acid derivatives of estradiol which are especially useful as postcoital contraceptive agents and to provide a technologically simple process by means of which the carbonic acid derivatives of estradiol having the foregoing formula can be produced. It was found that the compounds having the foregoing general formula can be prepared from a new estradiol derivative, namely, the chlorocarbonic acid ester of 3-methoxy-17β-hydroxyestra-1,3,5(10)-triene, which is referred to hereinafter as 3-methoxy-17βchlorocarbonyloxy-1,3,5(10)-triene (having the foregoing general formula in which $R^1$ is a methyl and $R^2$ is a chlorine radical), which can be obtained in very pure form by the reaction of phosgene (carbonyl chloride, $COCl_2$) with the 3-methyl ether of estradiol, namely, 3-methoxy-17β-hydroxyestra-1,3,5(10)-triene, or from the known 17β-chlorocarbonic acid ester of estradiol, nammely, 3-hydroxy-17β-chlorocarbonyloxyestra-1,3,5(10)-triene (having the foregoing general formula in which $R^1$ is a hydrogen and $R^2$ is a chlorine radical).

The conversion of the foregoing chlorocarbonic acid esters may be effected with nucleophilic reagents at room or at lower or higher temperatures than room temperature in organic solvents or mixtures of solvents such as acetone, aqueous acetone, mixtures of acetone and methanol, tetrahydrofuran, benzene, or acetonitrile. It is immaterial whether the chlorocarbonic acid is reacted in the form of a crude or purified compound.

As nucleophilic agents which can be used for this purpose, ammonia, alkylamines, aralkylamines and dialkylamines, cyclohexylamine, unsubstituted arylamines and arylamines substituted in the aromatic nucleus, substituted hydrazines, sulfonamides, aliphatic and aromatic mercaptans, diethylaminoethanol or unsaturated alcohols, unsubstituted phenols and phenols substituted in the aromatic nucleus, oximes, cyanohydrins, thiourea, as well as inorganic azides and cyanides, are particularly suitable. As reactants, a proton-acceptor, for example, triethylamine and alkali-metal hydroxides, can be added, if required. The treatment and purification of the substances can be effected in accordance with conventional procedures.

In the process the amine can be present as such or in the form of a salt which is easier to handle with corresponding additions of a sufficiently strong proton-acceptor. Nonetheless the alcohols and phenols can be used together with a proton-acceptor or in the form of an alkali-metal alcoholate or phenate.

It was further discovered that the required cyanohydrin and hydrazone derivatives of acetone that are required in the reaction can be formed directly from acetone in the reaction mixture by adding an alkali-metal cyanide or hydrazine hydrate or a substituted hydrazine thereto.

All of the compounds of the present invention exhibit effectiveness as contraceptive agents. In addition, the compounds exhibit unexpectedly lower activity than normally is exhibited by estrogenic hormones and they possess an especially very favorable ratio between their general contraceptive and postcoital contraceptive activities, on the one hand, and their typical estrogenic hormonal effects, such as the responses they produce on the uterus and the vagina, and also their antigonadotrophic effect, on the other hand. The estrogenic and antigonadotrophic effects of the compounds of the present invention generally are relatively lower than that of estrogenic hormones, which is especially significant in a pharmaceutical which is destined for use as a postcoital contraceptive agent. Thus, for example, the compound of Example 11 (3-methoxy-17β-phenylaminocarbonyloxyestra-1,3,5(10)-triene, conforming to the general formula in which $R^1$ is a phenylamino radical) is only 2.9% as active as Mestranol, namely 3-methoxy-17α-ethynylestra-1,3,5(10)-trien-17β-ol, in producing a uterine response, and 4.4% as active in its antigonadotrophic effect. However, it is about 140% as active a contraceptive as is Mestranol. The compound of Example 15, namely, 3-methoxy-17β-((2,2-dimethylhydrazino)carbonyloxyestra-1,3,5(10)-triene), conforming to the general formula in which $R^1$ is a methyl and $R^2$ is a 2,2-dimethylhydrazino radical, is 20% or 50% as active as Mestranol in producing a uterine or antigonadotrophic effect and equal or stronger than Mestranol in its contraceptive effect.

The ratio of the postcoital contraceptive activity to activity in producing a uterine response of the 3-methoxy-17β-phenylaminocarbonyloxyestra-1,3,5(10)-triene of Example 11 is better than Mestranol by a factor of 8 and the ratio of its postcoital contraceptive activity to its antigonadotrophic activity by a factor of 6.

The compounds of the present invention and processes of producing the same are further illustrated and described in the Examples which follow.

For convenience, the compounds are named herein as derivatives of the hydrocarbon estra-1,3,5(10)-triene, although each is a carbonic acid ester of estradiol corresponding to estradiol in which the hydroxyl radical in the 17β position has been esterified by carbonic or a substituted carbonic acid.

The name of the compound to which the Example is directed is included after the number of the Example and in parenthesis after this name are included the formulae of the $R^1$ and $R^2$ substituents of the foregoing general formula that are included in the named compound.

In each of the Examples the specific optical rotations [α] pertain to a 0.5% solution of the compound in chloroform (c=0.5 in $CHCl_3$) unless otherwise specified.

EXAMPLE 1

3-Methoxy-17β-chlorocarbonyloxyestra-1,3,5(10)-triene($R^1$ is —$CH_3$, $R^2$ is —Cl)

To 70 milliliters of an approximately 20% solution of phosgene in benzene is added 3.5 grams of 3-methoxy-17β-hydroxyestra-1,3,5(10)-triene and, after it had dissolved, 8 milliliters of a solution of triethylamine in benzene (1 volume triethylamine to 5 volumes of benzene) was added thereto. The mixture was continuously stirred and maintained at room temperature for a period of 1.5 hours, after which the excess phosgene was expelled by passing a stream of air through the reaction mixture. The reaction mixture was then evaporated at reduced pressure. The residue of the evaporation was then dissolved in boiling benzene and filtered, and the filtrate was concentrated by evaporation. There was thus obtained, after cooling and drying by suction and recrystallization, 3.66 grams of the product that is referred to in the subject heading of this Example, which is equivalent to a yield of 85% of the theoretical. The compound had a melting point of 144°–147°C and its specific optical rotation $[\alpha]_D^{21.5}$ was + 58°.

EXAMPLE 2

3-Methoxy-17β-aminocarbonyloxyestra-1,3,5(10)-triene ($R^1$ is —$CH_3$, $R^2$ is —$NH_2$)

Three hundred (300) milligrams of 3-methoxy-17β-chlorocarbonyloxyestra-1,3,5(10)-triene whose preparation was described in Example 1 was dissolved in 30 milliliters of acetone. While cooling the solution in ice water and stirring, 3 milliliters of a concentrated aqueous solution of ammonium hydroxide (28% $NH_3$ solution) was added in small increments within a period between 2 to 3 minutes. Water was then added in such amount as to produce complete precipitation of the subject compound. The compound was thus obtained in an essentially quantitative yield. Its melting point was 254°–257°C after recrystallization from ethanol and its specific optical rotation $[\alpha]_D^{23}$ was + 50.5.

EXAMPLE 3

3-Methoxy-17β-ethylaminocarbonyloxyestra-1,3,5(10)-triene ($R^1$ is —$CH_3$, $R^2$ is —$NHC_2H_5$)

To a mixture of 500 milligrams of 3-methoxy-17β-chlorocarbonyloxyestra-1,3,5(10)-triene and 200 milligrams of ethylamine hydrochloride and 50 milliliters of acetone that was stirred and cooled in an ice bath was slowly added a solution of 120 milligrams of sodium hydroxide in 5 milliliters of water. After 30 minutes the subject compound was precipitated in essentially pure form by addition of water to the reaction mixture. A yield of 480 grams, equivalent to 93.5% of the theoretical, was obtained. The compound, after recrystallization from ethanol, had a melting point of 179°–181°C and its specific optical rotation $[\alpha]_D^{21.5}$ was + 59°.

EXAMPLE 4

3-Hydroxy-17β-ethylaminocarbonyloxyestra-1,3,5(10)-triene ($R^1$ is —H, $R^2$ is —$NHC_2H_5$)

To 200 milligrams of 3-hydroxy-17β-chlorocarbonyloxyestra-1,3,5(10)-triene in 10 milliliters of acetone maintained in an ice bath was slowly added 0.5 milliliter of ethylamine over the course of 5 minutes, followed by 1 milliliter of concentrated hydrochloric acid dissolved in 70 milliliters of water. The subject compound that thus precipitated, which was separated by filtration and dried by suction, weighed 180 milligrams, equivalent to a yield of 72% of the theoretical. After recrystallization from aqueous methanol, it had a melting point of 243°–248°C and a specific optical rotation $[\alpha]_D^{23}$ of + 61°.

The term "recrystallization from aqueous methanol" and similar terms, when used herein, are to be understood to refer to a process in which the solid is dissolved in methanol and thereafter water is added to the solution in small increments until crystallization starts, whereupon the addition of water is discontinued and the solution is allowed to stand while the process of crystallization thus started continues.

EXAMPLE 5

3-Hydroxy-17β-methylaminocarbonyloxyestra-1,3,5(10)-triene ($R^1$ is —H, $R^2$ is —$NHCH_3$)

In accordance with the same procedure that is described in Example 4, the subject compound was made by reacting 1 gram of 3-hydroxy-17β-chlorocarbonyloxyestra-1,3,5(10)-triene and 8 milliliters of a 33% aqueous solution of methylamine. After addition of a dilute aqueous solution of hydrochloric acid, the subject compound was obtained in pure crystalline form in a yield of 1.1 grams, which is equivalent to 91% of the theoretical. The compound had a melting point of 259°–263°C and a specific optical rotation $[\alpha]_D^{20}$ of + 55°.

EXAMPLE 6

3-Methoxy-17β-benzylaminocarbonyloxyestra-1,3,5(10)-triene ($R^1$ is —$CH_3$, $R^2$ is —$NHCH_2C_6H_5$)

To a solution of 2.4 grams of 3-methoxy-17β-chlorocarbonyloxyestra-1,3,5(10)-triene in 40 milliliters of acetone was added 2.5 milliliters of benzylamine and the mixture was stirred at room temperature for a period of 10 minutes. After slowly adding water that was slightly acidified with hydrochloric acid, the crude subject compound was substantially quantitatively precipitated. It was separated by filtration and recrystalized from ethanol. The yield was 2.38 grams, which is equivalent to 81% of the theoretical, and the compound had a melting point of 171°–174°C and a specific optical rotation $[\alpha]_D^{21.5}$ of + 57°.

EXAMPLE 7

3-Hydroxy-17β-benzylaminocarbonyloxyestra-1,3,5(10)-triene ($R^1$ is —H, $R^2$ is —$NHCH_2C_6H_5$)

In accordance with the procedure that is described in Example 4, to a solution of 1 gram of 3-hydroxy-17β- chlorocarbonyloxyestra-1,3,5(10)-triene in 25 milliliters of acetone was added 1.5 milliliters of benzylamine and the mixture was stirred for 10 minutes. A solution of 15 milliliters of concentrated hydrochloric acid and 15 milliliters of water and subsequently 200 milliliters of water were then added slowly thereto and the precipitated produce was separated by filtration, dried by suction and recrystallized from a small quantity of ethanol. The yield was 860 milligrams, equivalent to 59% of the theoretical, and the compound had a melting point of 138°–142°C and a specific optical rotation $[\alpha]_D^{25}$ of + 13°.

EXAMPLE 8

3-Methoxy-17β-cyclohexylaminocarbonyloxyestra-1,3,5(10)-triene ($R^1$ is —$CH_3$, $R^2$ is —$NHC_6H_{11}$)

In accordance with the same procedure as described in Example 6, to a solution of 1 gram of 3-methoxy-17β-chlorocarbonyloxyestra-1,3,5(10)-triene in 100 milliliters of acetone was added at room temperature 1 milliliter of cyclohexylamine and the mixture was stirred for 30 minutes. The mixture was then cooled in an ice bath and 10 milliliters of concentrated hydrochloric acid in 390 milliliters of water was slowly added thereto and the precipitated product was separated by filtration and dried by suction. The subject compound was thus obtained in a yield of 1.1 grams, which is equivalent to 93% of the theoretical. Its melting point after recrystallization from aqueous ethanol was 89°–91°C and it had a specific optical rotation $[\alpha]_D^{25}$ of + 53°.

EXAMPLE 9

3-Methoxy-17β-diethylaminocarbonyloxyestra-1,3,5(10)-triene ($R^1$ is —$CH_3$, $R^2$ is —$N(C_2H_5)_2$)

In accordance with the procedure described in Example 3, to a mixture of 500 milligrams of 3-methoxy-17β-chlorocarbonyloxyestra-1,3,5(10)-triene, 300 milligrams of diethylamine hydrochloride and 50 milliliters of acetone that was maintained in an ice bath was slowly added a solution of 120 milligrams of sodium hydroxide in 5 milliliters of water, and the subject compound was precipitated by the addition of water. The yield was 430 milligrams, which is equivalent to 78% of the theoretical and compound was chromatographically pure. It had a double melting point of 77°–79°C and then 89°–90°C after the product was recrystallized from aqueous methanol. It had a specific optical rotation $[\alpha]_D^{23}$ of + 75.5°.

EXAMPLE 10

3-Hydroxy-17β-dimethylaminocarbonyloxyestra-1,3,5(10)-triene ($R^1$ is —H, $R^2$ is —$N(CH_3)_2$)

To a solution of 1 gram of 3-hydroxy-17β-chlorocarbonyloxyestra-1,3,5(10)-triene in 50 milliliters of acetone that was cooled in an ice bath was added 800 milligrams of dimethylamine hydrochloride and a solution of 340 milligrams of sodium hydroxide in 6 milliliters of water. After 10 minutes, 200 milliliters of water was slowly added thereto and finally a few drops of concentrated hydrochloric acid. The subject compound was thereby precipitated in the form of glistening crystals. The compound was obtained in a yield of 1.15 grams, which is equivalent to 91% of the theoretical, and it had a melting point of 230°–235°C and a specific optical rotation $[\alpha]_D^{25}$ of + 7°.

EXAMPLE 11

3-Methoxy-17β-phenylaminocarbonyloxyestra-1,3,5(10)-triene ($R^1$ is —$CH_3$, $R^2$ is —$NHC_6H_5$)

In accordance with the procedure described in Example 6, 0.5 milliliter of aniline was slowly added to a mixture of 300 milligrams of 3-methoxy-17β-chlorocarbonyloxyestra-1,3,5(10)-triene in 30 milliliters of acetone and the mixture was stirred at room temperature. After about 15 minutes dilute hydrochloric acid was added thereto and the crystals that were thus precipitated were separated by filtration and dried by suction and recrystallized from aqueous ethanol. The yield of the subject compound was 300 milligrams, which is equivalent to 87% of the theoretical, and the compound had a melting point of 165°–167°C and a specific optical rotation $[\alpha]_D^{24}$ of + 38°.

EXAMPLE 12

3-Hydroxy-17β-phenylaminocarbonyloxyestra-1,3,5(10)-triene ($R^1$ is —H, $R^2$ is —$NHC_6H_5$)

In accordance with the procedure described in Example 8, to a solution of 1 gram of 3-methoxy-17β-chlorocarbonyloxyestra-1,3,5(10)-triene in 100 milliliters of acetone, was added with stirring while the solution was cooled in an ice bath, 0.7 milliliter of aniline and the mixture was stirred for 30 minutes. A solution of 10 mililiters of concentrated hydrochloric acid in 390 milliliters of water was then added thereto and an oily liquid separated. This oily liquid was extracted from the mixture with chloroform and the extract was evaporated and the solid residue was dissolved in isopropanol and water was added thereto until crystallization started. The yield was 840 milligrams, which is equivalent to 58% of the theoretical and the compound had a melting point of 106°–109°C and a specific optical rotation $[\alpha]_D^{22}$ of + 36°.

EXAMPLE 13

3-Methoxy-17β-(p-tolylamino)carbonyloxyestra-1,3,5(10)-triene ($R^1$ is —$CH_3$, $R^2$ is —$NHC_6H_4CH_3$)

To a solution of 300 milligrams of 3-methoxy-17β-chlorocarbonyloxyestra-1,3,5(10)-triene in 30 milliliters of acetone was slowly added at room temperature 300 milligrams of p-toluidine(4-aminotoluene). After 30 minutes of stirring the mixture was cooled in an ice bath and dilute hydrochloric acid was slowly added thereto, whereupon the subject compound precipitated in crystalline form in a substantially quantitative amount. Its melting point was 184°–187°C and its specific optical rotation $[\alpha]_D^{21.5}$ was + 46°.

EXAMPLE 14

3-Methoxy-17β-(p-hydroxyphenylamino)carbonyloxyestra-1,3,5(10)-triene ($R^1$ is —$CH_3$, $R^2$ is —$NHC_6H_4OH$)

A solution of 120 mmilligrams of sodium hydroxide in 6 milliliters of water was slowly added to a stirred slurry of 440 milligrams of p-aminophenol hydrochloride and a solution of 300 milligrams of 3-methoxy-17β-chlorocarbonyloxyester-1,3,5(10)-triene in 30 milliliters of acetone. After stirring for 10 minutes at room temperature, dilute hydrochloric acid was added, the precipitate that formed was separated by filtration and dried by suction. The yield was 340 grams of the subject compound, which is equivalent to 93% of the theoretical, and the compound had a melting point of 219°–222°C, after recrystallization from aqueous isopropanol and reprecipitating it and a specific optical rotation $[\alpha]_D^{21.5}$ of + 35°.

EXAMPLE 15

3-Methoxy-17β-(2,2-dimethylhydrazino)carbonyloxyestra-1,3,5(10)-triene ($R^1$ is —$CH_3$, $R^2$ is —$NHN(CH_3)_2$)

To a solution of 300 milligrams of 3-methoxy-17β-chlorocarbonyloxyestra-1,3,5(10)-triene in 20 milliliters of dry tetrahydrofuran that was maintained at a temperature of 15°C was added 1 milliliter of 1,1-dimethylhydrazine. After a period of between 5 and 10 minutes, water was added and the precipitate was separated by filtration and dried by suction. A substantially quantitative yield of the subject compound was thus obtained. After recrystllization from aqueous methanol, 240 milligrams of the compound, equivalent to a yield of 75% of the theoretical, was obtained. The compound had a melting point of 179°–181°C and the specific optical rotation $[\alpha]_D^{21.5}$ of a solution of 0.6 gram of the compound in 100 milliliters of chloroform was + 54°.

EXAMPLE 16

3-Hydroxy-17β-(2,2-dimethylhydrazino)carbonyloxyestra-1,3,5(10)-triene ($R^1$ is —H, $R^2$ is —$NHN(CH_3)_2$)

To a solution of 1 gram of 3-hydroxy-17β-chlorocarbonyloxyestra-1,3,5(10)-triene in 20 milliliters of dry tetrahydrofuran was added 0.55 milliliter of 1,1-dimethylhydrazine and the mixture was stirred for 30 minutes, after which period water was added thereto. The mixture was then extracted with chloroform and the chloroform extract was subjected to chromatographic separation by means of a column containing 30 grams of silica gel, which was eluted with successive portions of a mixture of benzene and ether, each portion having an increasing proportion of ether, from a ratio of 6:1 at the start to 1:2 at the end. After such thin-layer chromatographic separation, the proper fraction was selected and evaporated to yield the pure subject compound which, after recrystallization from ethanol, had a melting point of 180°–189°C and a specific optical rotation $[\alpha]_D^{22}$ of + 52°. The yield was 800 milligrams, which is equivalent to 75% of the theoretical.

EXAMPLE 17

3-Methoxy-17β-isopropylidenehydrazinocarbonyloxyestra-1,3,5(10)-triene ($R^1$ is –$CH_3$, $R^2$ is —$NHN=C(CH_3)_2$ To a solution of 1 gram of 3-methoxy-17β-chlorocarbonyloxyestra-1,3,5(10)-triene in 20 milliliters of acetone that was continuously stirred while maintained in an ice bath was slowly added 1.2 milliliters of 98% hydrozine hydrate. The stirring was continued for 1 hour, after which additional water was separated to the reaction mixture, the precipitate was separated by filtration and dried with suction, and redissolved in a mixture of ether and acetone in the ratio of 8 volumes of ether to 1 volume of acetone. This solution was vigorously shaken with water, whereupon the subject compound separated as a pure crystalline hydrate. The yield was 850 milligrams, equivalent to 73% of the theoretical, and the compound had a melting point of 93°–95°C and a specific optical rotation $[\alpha]_D^{23}$ of + 63°.

EXAMPLE 18

3-Methoxy-17β-(p-tolylsulfonamidocarbonyloxy)estra-1,3,5(10)-triene ($R^1$ is —$CH_3$, $R^2$ is —$SO_2NHC_6H_4CH_3$)

A mixture of 300 milligrams of 3-methoxy-17β-chlorocarbonyloxyestra-1,3,5(10)-triene and 147 milligrams of p-toluensulfonamide in 30 milliliters of dried acetone was stirred at room temperature. During the course of 30 minutes, three 0.3 milliliter portions of triethylamine were added to the mixture. After 2 hours, dilute sulfuric acid was added to the mixture and the mixture was extracted with ether. After washing the ether extract with water, drying and evaporating the same, the residue consisting of the subject compound was crystallized from aqueous methanol. The yield was 285 milligrams, equivalent to 68% of the theoretical. The compound has a melting point of 181°–184°C and a specific optical rotation $[\alpha]_D^{23}$ of + 24.5°.

EXAMPLE 19

3-Methoxy-17β-ethylmercaptocarbonyloxyestra-1,3,5(10)-triene ($R^1$ is $CH_3$, $R^2$ is —$SC_2H_5$)

To a stirred solution of 300 milligrams of 3-methoxy-17β-chlorocarbonyloxyestra-1,3,5(10)-triene in 15 milliliters of dry benzene that was maintained in an ice bath was slowly added 1.5 milliliters of ethylmercaptan and subsequently a solution of 0.2 milliliter of triethylamine in 5 milliliters of benzene and the mixture was allowed to stand for 2 hours at room temperature. The mixture was then evaporated at reduced pressure and the residue was crystallized from aqueous ethanol. A yield of 285 milligrams, which is equivalent to 88.5% of the theoretical, was obtained. The compound had a melting point of 81°–83°C and a specific optical rotation $[\alpha]_D^{23}$ of + 39°.

EXAMPLE 20

3-Methoxy-17β-phenylmercaptocarbonyloxyestra-1,3,5(10)-triene ($R^1$ is —$CH_3$, $R^2$ is —$SC_6H_5$)

By using 350 milligrams of 3-methoxy-17β-chlorocarbonyloxyestra-1,3,5(10)-triene and substituting 0.1 milliliter of thiophenol for the ethylmercaptan in Example 19 and proceeding otherwise as described therein, the subject compound, having a melting point of 137°–138.5°C, after recrystallization from aqueous acetone and a specific optical rotation $[\alpha]_D^{23}$ of + 16.9°, was obtained in a substantially quantitative yield.

EXAMPLE 21

3-Methoxy-17β-(2-cyanoisopropoxy)carbonyloxyestra-1,3,5(10)-triene ($R^1$ is —$CH_3$, $R^2$ is —$OC(CN)(CH_3)_2$)

A mixture of 200 milligrams of 3-methoxy-17β-chlorocarbonyloxyestra-1,3,5(10)-triene, 600 milligrams of potassium cyanate and 25 milliliters of dry acetone was stirred at room temperature for 24 hours. The reaction mixture was then filtered and the clear filtrate thus obtained was evaporated at reduced pressure. The residue was recrystallized from petroleum benzine having a boiling range of 50°–60°C. The yield of the subject compound was 140 milligrams, equivalent to 61% of the theoretical. Its melting point was 115°–118°C and it had a specific optical rotation $[\alpha]_D^{23.5}$ of + 27.5°.

EXAMPLE 22

3-Methoxy-17β-propargyloxycarbonyloxyestra-1,3,5(10)-triene (R¹ is —CH₃, R² is —OCH₂C ≡ CH)

To a solution of 400 milligrams of 3-methoxy-17β-chlorocarbonyloxyestra-1,3,5(10)-triene in 10 milliliters of dry acetone was added 10 milliliters of propargyl alcohol (2-propyn-1-ol) and while the mixture was still stirred, 2 milliliters of triethylamine. After the mixture had been stirred for 1 hour, water was added and the precipitated product was separated by filtration and dried by suction. A yield of 400 milligrams of the subject compound, equivalent to 95% of the theoretical yield, was obtained. The compound had a melting point of 76.5°–78.5°C, after recrystallization from aqueous methanol and a specific optical rotation $[\alpha]_D^{23.5}$ of + 45°.

EXAMPLE 23

3-Methoxy-17β-phenoxycarbonyloxyestra-1,3,5(10)-triene (R¹ is —CH₃, R² is —OC₆H₅)

To a solution of 300 milligrams of 3-methoxy-17β-chlorocarbonyloxyestra-1,3,5(10)-triene in 30 milliliters of acetone was added a solution of 300 milligrams of sodium phenolate in 6 milliliters of water and the mixture was stirred for 30 minutes at room temperature, then diluted with water and extracted with ether. The ether extract was washed with water, dried and then evaporated and the residue was dissolved in methanol and water was added to the solution until crystallization started. The yield was 240 milligrams, which is 68% of the theoretical, and the compound had a melting point of 112°–113°C and a specific optical rotation $[\alpha]_D^{23}$ of + 17.5°.

EXAMPLE 24

3-Methoxy-17β-(p-methoxyphenoxy)carbonyloxyestra-1,3,5(10)-triene (R¹ is —CH₃, R² is —OC₆H₄OCH₃)

To a solution of 300 milligrams of 3-methoxy-17β-chlorocarbonyloxyestra-1,3,5(10)-triene in 30 milliliters of acetone was added a solution of 310 milligrams of p-methoxyphenol and 90 milligrams of sodium hydroxide in 5.5 milliliters of water and the mixture was stirred for 15 minutes at room temperature, diluted with water, and treated further exactly as described in Example 23, except that the residue was dissolved in isopropanol instead of methanol. The yield was 280 milligrams of the subject compound, which is equivalent to 77% of the theoreticcal. The compound had a melting point of 130°–132°C and a specific optical rotation $[\alpha]_D^{21.5}$ of + 16°.

EXAMPLE 25

3-Methoxy-17β-(p-nitrophenoxy)carbonnyloxyestra-1,3,5(10)-triene (R¹ is —CH₃ R² is —OC₆H₄NO₂)

To a solution of 300 milligrams of 3-methoxy-17β-chlorocarbonyloxyestra-1,3,5(10)-triene in 30 milliliters of acetone was added with stirring a solution of 100 milligrams of sodium hydroxide in 6 milliliters of water. After several minutes of stirring at room temperature, crystals began to separate out of the mixture. Small increments of water were then slowly added to the mixture, during a period of about 30 minutes, during which the rate of crystallization increased. The yield of crystals of the subject compound thus prepared was 330 milligrams, which is equivalent to 85% of the theoretical, and the compound has a melting point of 153°–156°C, after recrystallization from ethanol, and a specific optical rotation $[\alpha]_D^{21.5}$ of + 15°.

EXAMPLE 26

3-Methoxy-17β-(8-quinolyloxy)carbonyloxyestra-1,3,5(10)-triene (R¹ is —CH₃, R² is —OC₉H₆N)

To a solution of 300 milligrams of 3-methoxy-17β-chlorocarbonyloxyestra-1,3,5(10)-triene in 30 milliliters of acetone was added with stirring 300 milligrams of 8-quinolinol and a solution of 100 milligrams of sodium hydroxide in 5 milliliters of water. After several minutes the mixture was diluted with water, whereupon the subject compound precipitated almost quantitatively in the form of crystals, which had a melting point of 180°–183°C and a specific optical rotation of $[\alpha]_D^{21.5}$ of + 9°.

EXAMPLE 27

3-Methoxy-17β-azidocarbonyloxyestra-1,3,5(10)-triene (R¹ is —CH₃, R² is —N₃)

To a solution of 300 milligrams of 3-methoxy-17β-chlorocarbonyloxyestra-1,3,5(10)-triene in 30 milliliters of acetone was slowly added a solution of 600 milligrams of sodium azide in 7 milliliters of water while the mixture was stirred at room temperature. After 3 hours water was added to the reaction mixture and the precipitate was separated by filtration and dried by suction and then recrystallized from aqueous isopropanol. The yield was 280 milligrams, which is equivalent to 91% of the theoretical, and the subject compound that was thus obtained had a melting point of 96°–98°C. A solution of 1 gram of the compound in 100 milliliters of chloroform had a specific optical rotation $[\alpha]_D^{23}$ of + 29°.

EXAMPLE 28

3-Hydroxy-17β-azidocarbonyloxyestra-1,3,5(10)-triene (R¹ is —H, R² is —N₃)

To a solution of 1.15 grams of 3-hydroxy-17β-chlorocarbonyloxyestra-1,3,5(10)-triene in 50 milliliters of acetone was added a solution of 600 milligrams of sodium azide in 6 milliliters of water and the mixture was stirred at room temperature for 30 minutes, after which it was diluted with water, the mixture was extracted with chloroform, the chloroform extract was dried and evaporated and the residue was crystallized from aqueous ethanol. The yield was 1.1 grams of the subject compound, which is equivalent to 77% of the theoretical. The compound had a melting point of 145°–148°C and a specific optical rotation $[\alpha]_D^{21}$ of + 30°.

EXAMPLE 29

3-Methoxy-17β-cyanocarbonyloxyestra-1,3,5(10)-triene (R¹ is —CH₃, R² is —CN)

To a solution of 300 milligrams of 3-methoxy-17β-chlorocarbonyloxyestra-1,3,5(10)-triene in 30 milliliters of acetonitrile was added 250 milligrams of potassium cyanide and the mixture was vigorously stirred. After the reaction was completed, the mixture was filtered, evaporated under reduced pressure, and the residue was digested with petroleum benzine having a boiling range of 50° to 60°C, and the resulting solution was

EXAMPLE 30

3-Methoxy-17β-isopropylideneaminooxycarbonyloxyestra-1,3,5(10)-triene (R¹ is —CH₃, R² is —ON=C(CH₃)₂)

To a solution of 300 milligrams of 3-methoxy-17β-chlorocarbonyloxyestra-1,3,5(10)-triene in 40 milliliters of acetone was added a solution of 900 milligrams of acetoxime in 6 milliliters of water and the mixture was stirred at room temperature for 2.5 hours. Water was then added to the mixture, whereupon the subject compound precipitated in a substantially quantitative amount. After separation of the precipitate and drying it by suction, and recrystallizing it from aqueous methanol, 240 milligrams, which is equivalent to a yield of 72% of the theoretical, was obtained. The compound had a melting point of 114°–119°C and a specific optical rotation $[\alpha]_D^{23}$ of + 44°.

EXAMPLE 31

3-Methoxy-17β-isothioureidocarbonyloxyestra-1,3,5(10)-triene (R¹ is —CH₃, R² is —S-C(NH₂)=NH To a solution of 200 milligrams of 3-methoxy-17β-chlorocarbonyloxyestra-1,3,5(10)-triene in 20 milliliters of acetone, 200 milligrams of thiourea was added and the mixture was stirred at room temperature. After all of the thiourea had dissolved, a colorless precipitate began to separate. The stirring was continued for another 30 minutes, after which the precipitate was separated by filtration, dried by suction, washed with acetone and dried in air. The yield of the subject compound thus produced was 230 milligrams, which is equivalent to 94% of the theoretical, and the compound had a melting point of 181°–187°C.

EXAMPLE 32

3-Methoxy-17β-(N,N-diethylaminoethoxy)carbonyloxyestra-1,3,5(10)-triene hydrochloride (R¹ is —CH₃, R² is —OC₂H₄N(C₂H₅)₂)

To a solution of 1.5 grams of 3-methoxy-17β-chlorocarbonyloxyestra-1,3,5(10)-triene in 18milliliters of boiling acetone were slowly added with stirring a solution of 0.5 gram of 2-diethylaminoethanol in 2 milliliters of acetone. After cooling, n-pentane was added to the mixture and the precipitate was separated by filtration and dried by suction, dissolved in chloroform, and filtered. To the filtrate was added cyclohexane, whereupon crystals of the subject compound formed, which were separated by filtration and dried by suction.

The yield was 1.37 grams, which is equivalent to 68% of the theoretical, and the subject compound had a melting point of 176°–183°C.

EXAMPLE 33

3-Hydroxy-17β-(N,N-diethylaminoethoxy)carbonyloxyestra-1,3,5(10)-triene hydrochloride (R¹ is —H, R² is —OC₂H₄N (C₂H₅)₂)

To a solution of 1.22 grams of 3-hydroxy-17β-chlorocarbonyloxyestra-1,3,5(10)-triene in 18 milliliters of boiling acetone was added with stirring a solution of 0.5 gram of 2-diethylaminoethanol in 2 milliliters of acetone. The crystals that precipitated were separated from the mixture by filtration and washed with acetone and dried with air. A yield of 1.72 grams of the subject compound, which is equivalent to 85% of the theoretical, was thus obtained and the compound had a melting point of 210°–214°C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A carbonic acid derivative of estradiol having the following formula:

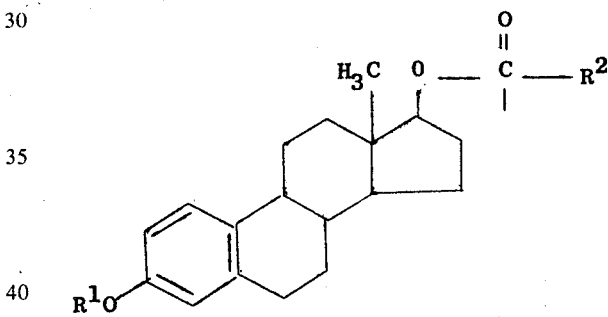

in which R¹ is a hydrogen or methyl radical, and R² is a chlorine, amino, methylamino, ethylamino, benzylamino, cyclohexylamino, dimethylamino, diethylamino, phenylamino, p-tolylamino, p-hydroxphenylamino, 2,2-dimethylhydrazino, isopropylidenehydrazino, p-tolylsufonamido, ethylmercapto, phenylmercapto, 2-cyanoisopropoxy, propargyloxy, phenoxy, p-methoxyphenoxy, p-nitrophenoxy, 8-quinolyloxy, azido, cyano, isopropylideneaminooxy, isothioureido, or N,N-diethylaminoethoxy radical.

2. A process for the production of a carbonic acid derivative of estradiol as defined in claim 1 which comprises intimately mixing together 3-hydroxy-17β-chlorocarbonyloxyestra-1,3,5(10)-triene or 3-methoxy-17β-chlorocarbonyloxyestra-1,3,5(10)-triene in an organic solvent of the group consisting of acetone, aqueous acetone, mixtures of acetone and methanol, tetrahydrofuran, benzene, acetonitrile, and mixtures of these solvents, and a nucleophilic reagennt having the formula R²H or an alkali-metal salt having the formula R²X in which X is an alkali-metal radical and in which formula R² has the significance specified in claim 1, and subsequentlyy recovering from the resulting reaction mixture the carbonic acid derivative of estradiol that is produced.

3. A process as defined in claim 2 in which an acid-binding substance of the group consisting of triethylamine and alkali-metal hydroxides is included in the reaction mixture.

4. A process as defined in claim 2 in which the reaction mixture is maintained at a temperature slightly below room temperature.

5. A process as defined in claim 2 in which the nucleophilic reagent is acetone cyanohydrin and the organic solvent is acetone in which process acetone cyanohydrin is formed directly in the reaction mixture by adding an alkalimetal cyanide thereto.

6. A process as defined in claim 2 in which the nucleophilic reagent is acetonehydrazone and the organic solvent is acetone, in which process acetone hydrazone is formed directly in the reaction mixture by adding hydrazine hydrate thereto.

7. A process as defined in claim 2 in which the organic solvent is acetone.

8. A carbonic acid derivative of estradiol according to claim 1 consisting of 3-methoxy-17β-chlorocarbonyloxyestra-1,3,5(10)-triene.

9. A carbonic acid derivative of estradiol according to claim 1 consisting of 3-methoxy-17β-aminocarbonyloxyestra-1,3,5(10)-triene.

10. A carbonic acid derivative of estradiol according to claim 1 consisting of 3-methoxy-17β-ethylaminocarbonyloxyestra-1,3,5(10)-triene.

11. A carbonic acid derivative of estradiol according to claim 1 consisting of 3-hydroxy-17β-ethylaminocarbonylextra-1,3,5(10)-triene.

12. A carbonic acid derivative of estradiol according to claim 1 consisting of 3-hydroxy-17β-methylaminocarbonyloxyestra-1,3,5(10)-triene.

13. A carbonic acid derivative of estradiol according to claim 1 consisting of 3-methoxy-17β-benzylaminocarbonyloxyestra-1,3,5(10)-triene.

14. A carbonic acid derivative of estradiol according to claim 1 consisting of 3-hydroxy-17β-benzylaminocarbonyloxyestra-1,3,5(10)-triene.

15. A carbonic acid derivative of estradiol according to claim 1 consisting of 3-methoxy-17β-cyclohexylaminocarbonyloxyestra-1,3,5-(10)-triene.

16. A carbonic acid derivative of estradiol according to claim 1 consisting of 3-methoxy-17β-diethylaminocarbonyloxyestra-1,3,5(10)-triene.

17. A carbonic acid derivative of estradiol according to claim 1 consisting of 3-hydroxy-17β-dimethylaminocarbonyloxyestra-1,3,5(10)-triene.

18. A carbonic acid derivative of estradiol according to claim 1 consisting of 3-methoxy-17β-phenylaminocarbonyloxyestra-1,3,5(10)-triene.

19. A carbonic acid derivative of estradiol according to claim 1 consisting of 3-hydroxy-17β-phenylaminocarbonyloxyestra-1,3,5(10)-triene.

20. A carbonic acid derivative of estradiol according to claim 1 consisting of 3-methoxy-17β-(p-tolylamino)carbonyloxyestra-1,3,5(10)-triene.

21. A carbonic acid derivative of estradiol according to claim 1 consisting of 3-methoxy-17β-(p-hydroxyphenylamino)carbonyloxyestra-1,3,5(10)-triene.

22. A carbonic acid derivative of estradiol according to claim 1 consisting of 3-methoxy-17β-(2,2-dimethylhydrazino)carbonyloxyestra-1,3,5(10)-triene.

23. A ccarbonic acid derivative of estradiol according to claim 1 consisting of 3-hydroxy-17β-(2,2-dimethylhydrazino)carbonyloxyestra-1,3,5(10)-triene.

24. A carbonic acid derivative of estradiol according to claim 1, consisting of 3-methoxy-17β-isopropylidenehydrazinocarbonyloxyestra-1,3,5(10)-triene.

25. A carbonic acid derivative of estradiol according to claim 1 consisting of 3-methoxy-17β-(p-tolylsulfonamidocarbonyloxy)estra-1,3,5(10)-triene.

26. A carbonic acid derivative of estradiol according to claim 1 consisting of 3-methoxy-17β-ethylmercaptocarbonyloxyestra-1,3,5(10)-triene.

27. A carbonic acid derivative of estradiol according to claim 1, consisting of 3-methoxy-17β-phenylmercaptocarbonyloxyestra-1,3,5(10)-triene.

28. A carbonic acid derivative of estradiol according to claim 1 consisting of 3-methoxy-17β-(2-cyanoisopropoxy)carbonyloxyestra-1,3,5(10)-triene.

29. A carbonic acid derivative of estradiol according to claim 1 consisting of 3-methoxy-17β-propargyloxycarbonyloxyestra-1,3,5(10)-triene.

30. A carbonic acid derivative of estradiol according to claim 1 consisting of 3-methoxy-17β-phenoxycarbonyloxyestra-1,3,5(10)-triene.

31. A carbonic acid derivative of estradiol according to claim 1 consistinng of 3-methoxy-17β-(p-methoxyphenoxy)carbonyloxyestra-1,3,5(10)-triene.

32. A carbonic acid derivative of estradiol according to claim 1 consisting of 3-methoxy-17β-(p-nitrophenoxy)carbonyloxyestra-1,3,5(10)-triene.

33. A carbonic acid derivative of estradiol according to claim 1 consisting of 3-methoxy-17β-(8-quinolyloxy)carbonyloxyestra-1,3,5(10)-triene.

34. A carbonic acid derivative of estradiol according to claim 1 consisting of 3-methoxy-17β-azidocarbonyloxyestra-1,3,5(10)-triene.

35. A carbonic acid derivative of estradiol according to claim 1 consisting of 3-hydroxy-17β-azidocarbonyloxyestra-1,3,5(10)-triene.

36. A carbonic acid derivative of estradiol according to claim 1 consisting of 3-methoxy-17β-cyanocarbonyloxyestra-1,3,5(10)-triene.

37. A carbonic acid derivative of estradiol according to claim 1 consisting of 3-methoxy-17β-isopropylideneaminooxycarbonyloxyestra-1,3,5(10)-triene.

38. A carbonic acid derivative of estradiol according to claim 1 consisting of 3-methoxy-17β-isothioureidocarbonyloxyestra-1,3,5(10)-triene.

39. A carbonic acid derivative of estradiol according to claim 1 consisting of 3-methoxy-17β-(N,N-diethylaminoethoxy)carbonyloxyestra-1,3,5(10)-triene hydrochloride.

40. A carbonic acid derivative of estradiol according to claim 1 consisting of 3-hydroxy-17β-(N,N-diethylaminoethoxy)carbonyloxyestra-1,3,5(10)-triene hydrochloride.

* * * * *